No. 780,571. Patented January 24, 1905.

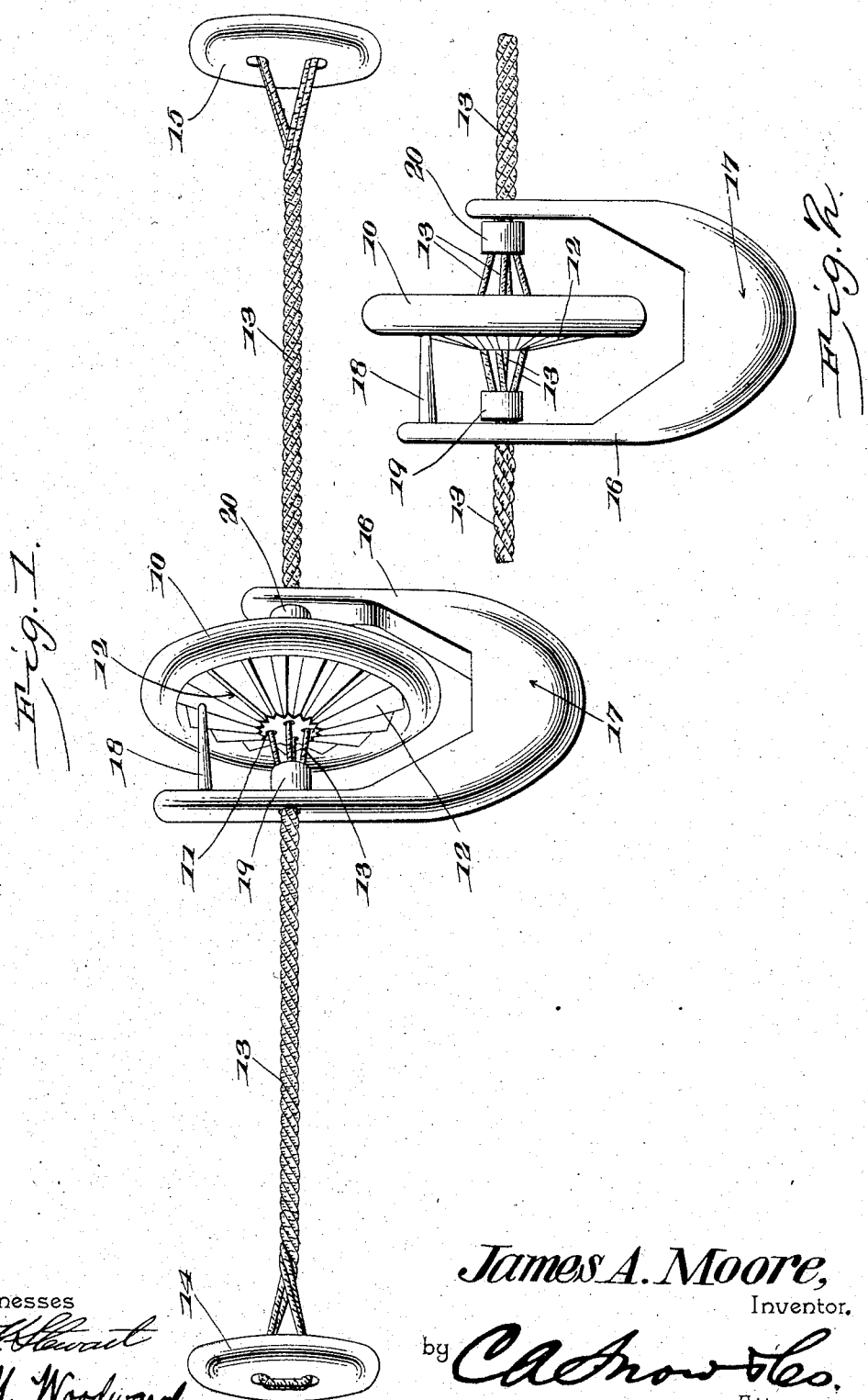

UNITED STATES PATENT OFFICE.

JAMES A. MOORE, OF WEIR, KANSAS, ASSIGNOR OF ONE-HALF TO GEORGE J. KNIGHTON, OF WEIR, KANSAS.

TOY.

SPECIFICATION forming part of Letters Patent No. 780,571, dated January 24, 1905.

Application filed October 29, 1904. Serial No. 230,542.

*To all whom it may concern:*

Be it known that I, JAMES A. MOORE, a citizen of the United States, residing at Weir, in the county of Cherokee and State of Kansas, have invented a new and useful Toy, of which the following is a specification.

This invention relates to toys of the class wherein a disk is caused to whirl rapidly by the alternate stretching and slackening of twisted cords, and has for its object to improve the construction and increase the interest-imparting character of devices of this class by providing means whereby buzzing or rattling sounds may be produced as the disk is rotated.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a perspective view of the improved device. Fig. 2 is a side elevation of the central portion of the same.

The improved device comprises a disk 10 of any desired size or form, but preferably with an enlarged rim to produce the requisite weight and with a plurality of apertures 11 spaced uniformly from the center and with spaced ribs 12 radially disposed upon one side. Passing through the apertures 11 are cords 13, equal in number to the apertures and with their extremities united, preferably, in pull-buttons 14 15. Mounted to swing upon the cords 13 at each side of the disk is a yoke-frame 16, having one end at 17 weighted and with a resilient arm 18 extending for engagement by the ribs 12 as the disk is rapidly rotated, and thereby produce sounds, as hereinafter more fully described. Encircling the cords 13 between the yoke-frame side members and the disk 10 are guard-sleeves 19 20, serving as spacers to maintain the yoke-frame in position. By this simple arrangement by grasping the button members in the hands and swinging the disk and yoke members rapidly with the cords held relatively slack the cords will be entwisted to any required degree, and then by alternately stretching and slackening upon the cords through the medium of the pull-buttons the disk will be rapidly rotated first in one direction and then in the opposite direction, as will be obvious. While this motion is being imparted to the disk, the radial ribs 12 will produce sounds by striking the resilient arm 18. The spacer-sleeves 19 20 serve an important purpose, as the cords 13 expanding between the side members of the yoke-frame and the disk serve to hold the sleeves spaced away from the disk and bearing in opposite directions against the inner faces of the side members of the yoke-frame maintain the latter spaced uniformly from the disk and secure thereby a correspondingly uniform action upon the resilient arm.

The member 18 may be of any required material and size to produce any required pitch of sound and may be varied as required, or a plurality of the arms may be required of different sizes to produce variety in the tones. Any desired kind of material may be employed for the disk 10 and other parts and may be of wood, metal, or other material. If wood is employed for the disk, it may be necessary to insert lead or other weights in the rim to secure the requisite weight.

Having thus described the invention, what is claimed is—

1. In a toy of the class described, a disk having a plurality of transverse apertures uniformly spaced from the center and provided with radiating ribs, cords passing through said apertures and united at the extremities upon opposite sides of the disk, and a yoke-frame swinging upon said cords at opposite sides of said disk and provided with a resilient arm for engaging said radial ribs and producing sounds when the disk is rapidly rotated by twisting said cords and alternately stretching and slackening the same.

2. In a toy of the class described, a disk having a plurality of transverse apertures uniformly spaced from the center and provided with radiating ribs, cords passing through said apertures and united at the extremities upon opposite sides of the disk, a yoke-frame swinging upon said cords at opposite sides of said disk and provided with a resilient arm for engaging said radial ribs and producing sounds when the disk is rapidly rotated by twisting said cords and alternately stretching and slackening the same, and stop-sleeves encircling the grouped cords between the disk and members of said yoke-frame.

3. In a toy of the class described, a disk having a plurality of transverse apertures uniformly spaced from the center and provided with radiating ribs, cords passing through said apertures and united at the extremities upon opposite sides of the disk, and a yoke-frame swinging upon said cords at opposite sides of said disk and weighted at one end and with a resilient arm for engaging said radial ribs and producing sounds when the disk is rapidly rotated by twisting said cords and alternately stretching and slackening them.

4. In a toy of the class described, a disk having apertures uniformly spaced from the center and provided with radiating ribs, cords passing through said apertures and united at the extremities upon opposite sides of the disk, a U-shaped yoke-frame mounted to swing by its leg members upon said cords at opposite sides of said disk and with a resilient arm extending from one of said leg members and engaging said radial ribs for producing sounds when the disk is rotated by the alternate stretching and slackening of the said cords when twisted.

5. In a toy of the class described, a disk having a plurality of transverse apertures uniformly spaced from the center and provided with radiating ribs, cords passing through said apertures and connected at the extremities to pull-buttons, a yoke-frame mounted to swing upon said cords upon opposite sides of said disk and provided with a resilient arm for engaging said ribs and producing sounds when the disk is rotated by the alternate stretching and slackening of the twisted cords, and guard-sleeves upon the cords between the yoke-frame and disk.

In testimony that I claim the foregoing as my own I have hereto affixed my signature in the presence of two witnesses.

JAMES A. MOORE.

Witnesses:
R. O. PETERSON,
J. H. BENNETT.